(12) United States Patent
Donate et al.

(10) Patent No.: US 8,906,991 B2
(45) Date of Patent: *Dec. 9, 2014

(54) LOW/ZERO VOC GLYCOL ETHER-ESTERS AND USE AS CLEAN-UP SOLVENTS AND PAINT THINNERS

(75) Inventors: Felipe A. Donate, Midland, MI (US); Aleksandr T. Gamble, Midland, MI (US); Sarah E. Ittner, Saginaw, MI (US); Rebecca J. Wachowicz, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/435,420

(22) Filed: Mar. 30, 2012

(65) Prior Publication Data

US 2012/0259049 A1    Oct. 11, 2012

Related U.S. Application Data

(60) Provisional application No. 61/473,249, filed on Apr. 8, 2011.

(51) Int. Cl.
*C08K 5/00* (2006.01)
*C09D 9/00* (2006.01)
*C09D 7/00* (2006.01)

(52) U.S. Cl.
CPC .............. *C09D 9/005* (2013.01); *C09D 7/001* (2013.01)
USPC ........... 524/284; 524/290; 524/292; 524/317; 560/109; 560/112; 560/193; 560/240

(58) Field of Classification Search
None
See application file for complete search history.

(56) References Cited

U.S. PATENT DOCUMENTS

| | | | | |
|---|---|---|---|---|
| 4,022,808 | A | * | 5/1977 | Yoshihara et al. ............ 554/149 |
| 4,061,612 | A | * | 12/1977 | Bertozzi et al. .............. 524/290 |
| 4,287,307 | A | * | 9/1981 | Hostettler .................... 521/51 |
| 4,489,188 | A | * | 12/1984 | Jones et al. .................. 524/292 |
| 5,609,678 | A | | 3/1997 | Bergman |
| 2007/0257233 | A1 | * | 11/2007 | Akutsu et al. ............... 252/364 |
| 2009/0198002 | A1 | | 8/2009 | Zhou et al. |
| 2010/0203003 | A1 | * | 8/2010 | Kokeguchi et al. ........... 424/74 |

FOREIGN PATENT DOCUMENTS

| | | |
|---|---|---|
| EP | 0136025 A2 | 4/1985 |
| EP | 1036025 A2 | 4/1985 |
| EP | 0501614 A2 | 9/1992 |
| FR | 2788703 A1 | 7/2000 |
| JP | 2000-044405 * | 2/2000 |
| WO | 2006098544 A1 | 9/2006 |
| WO | 2010120192 A1 | 10/2010 |

OTHER PUBLICATIONS

Smith, Review of Glycol Ether and Glycol Ether Ester Solvents Used in the Coating Industry, Environmental Health Perspectives, vol. 57, 1984, p. 1-4.*
Machine Translation of Kazutoshi et al. JP 2000-044405.*
Machine Translation of Kazutoshi et al. JP 2008-162844.*
European Search Report issued in EP Patent Application No. 12159801, dated Jun. 12, 2012.

* cited by examiner

*Primary Examiner* — Susannah Chung
*Assistant Examiner* — Robert T Butcher
(74) *Attorney, Agent, or Firm* — Karl E. Stauss; Ronald D. Bakule

(57) ABSTRACT

This invention relates to a clean-up solvent and paint thinner for solvent-borne resins and coatings selected from compositions of Formula (I)

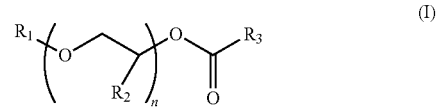

wherein $R_1$ is a $C_1$-$C_{10}$ alkyl group, phenyl or benzyl, $R_2$ is either hydrogen or methyl, $R_3$ is a carbon chain including 4-6 carbon atoms, and n=2-4;
of Formula (II)

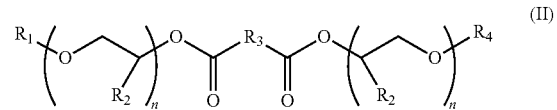

wherein $R_1$ and $R_4$ are, independently, $C_1$-$C_{10}$ alkyl groups, phenyl or benzyl, $R_2$ is either hydrogen or methyl, $R_3$ is a carbon chain including 0-4 carbon atoms, and n=1-4; and mixtures thereof.
The invention also relates to a solvent-borne composition including a solvent-borne polymer and the low and zero VOC composition of the invention; and a method for cleaning or thinning a solvent-borne composition.

3 Claims, No Drawings

LOW/ZERO VOC GLYCOL ETHER-ESTERS AND USE AS CLEAN-UP SOLVENTS AND PAINT THINNERS

This invention relates to low and zero VOC glycol ether-ester compositions suitable for use as clean-up solvents and paint thinners for solvent-borne resins and coatings. This invention particularly relates to a clean-up solvent and paint thinner for solvent-borne resins and coatings selected from compositions of Formula (I)

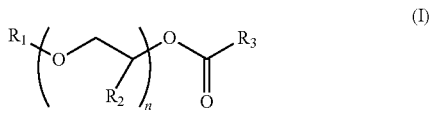

wherein $R_1$ is a $C_1$-$C_{10}$ alkyl group, phenyl or benzyl, $R_2$ is either hydrogen or methyl, $R_3$ is a carbon chain including 4-6 carbon atoms, and n=2-4;
of Formula (II)

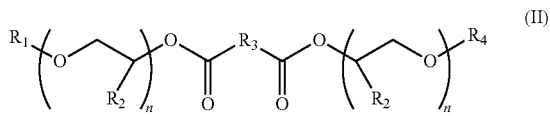

wherein $R_1$ and $R_4$ are, independently, $C_1$-$C_{10}$ alkyl groups, phenyl or benzyl, $R_2$ is either hydrogen or methyl, $R_3$ is a carbon chain including 0-4 carbon atoms, and n=1-4; and mixtures thereof.

The invention also relates to a solvent-borne composition including a solvent-borne polymer and the low and zero VOC composition of the invention and a method for cleaning or thinning a solvent-borne composition.

Volatile organic compound (VOC) emissions contribute to the creation of ozone, a main constituent of smog. In the US, VOC regulations established by the US Environmental Protection Agency (EPA) and enforced at the state level dictate the maximum concentration of volatile solvents in paints, clean up solvents, and other products. In Europe, VOC limits are defined by the 2004/42/EC Solvents Directive for Decorative Paints. VOC regulations have become more and more stringent and have affected the use of mineral spirits, VMP naphtha, and other type of solvents commonly used to thin solvent-borne paints and to clean up paint from brushes, spray guns, paint lines, and other tools used in painting. Water, acetone, and t-butyl acetate are volatile solvents but they are exempt from VOC regulations as they do not contribute to smog generation. Water, however, is not an effective solvent for the removal of a variety of paints. Acetone and t-butyl acetate are effective solvents for this use but are highly flammable and their use may compromise worker safety.

U.S. Pat. No. 5,609,678 discloses certain propylene glycol ethers used in thinning oil-based resins and in cleaning equipment contaminated with oil-based resins. Glycol ether-ester compositions suitable for use as clean-up solvents and paint thinners for solvent-borne resins and coatings are not disclosed.

U.S. Patent Application Publication No. 20090198002A1 discloses coalescent compositions for aqueous coating compositions including blends of dibasic esters such as bis-glycol ether esters of $C_4$-$C_6$ diacids specifically, succinic, glutaric, and adipic acids, with maximum boiling points of 400° C. Glycol ether-ester compositions suitable for use as clean-up solvents and paint thinners for solvent-borne resins and coatings are not disclosed.

The present invention serves to provide low or zero VOC compositions including certain glycol ether-esters that are suitable for use as clean-up solvents and thinners for solvent-borne compositions such as decorative and protective coatings for various substrates.

In a first aspect of the present invention there is provided a clean-up solvent and paint thinner for solvent-borne resins and coatings comprising a glycol ether-ester composition selected from the group of compositions of Formula (I)

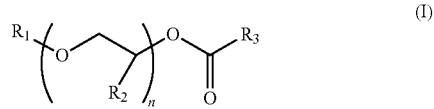

wherein $R_1$ is a $C_1$-$C_{10}$ alkyl group, phenyl or benzyl, $R_2$ is either hydrogen or methyl, $R_3$ is a carbon chain comprising 4-6 carbon atoms, and n=2-4;
of Formula (II)

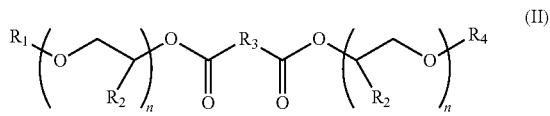

wherein $R_1$ and $R_4$ are, independently, $C_1$-$C_{10}$ alkyl groups, phenyl or benzyl, $R_2$ is either hydrogen or methyl, $R_3$ is a carbon chain comprising 0-4 carbon atoms, and n=1-4; and mixtures thereof.

In a second aspect of the present invention there is provided a solvent-borne composition comprising said clean-up solvent and paint thinner of the first aspect of the present invention and a solvent-borne polymer.

In a third aspect of the present invention there is provided a method for cleaning or thinning a solvent-borne polymeric composition comprising contacting the solvent-borne polymeric composition with the clean-up solvent and paint thinner for solvent-borne resins and coatings composition of the first aspect of the present invention.

The present invention relates to a clean-up solvent and paint thinner for solvent-borne resins and coatings comprising a glycol ether-ester composition selected from the group of compositions of Formula (I)

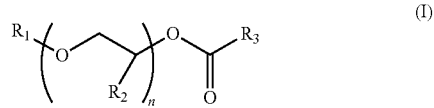

wherein $R_1$ is a $C_1$-$C_{10}$ alkyl group, phenyl or benzyl, $R_2$ is either hydrogen or methyl, $R_3$ is a carbon chain including 4-6 carbon atoms, and n=2-4;
of Formula (II)

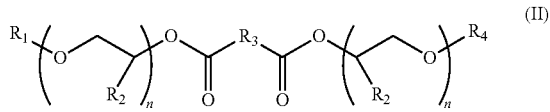

wherein $R_1$ and $R_4$ are, independently, $C_1$-$C_{10}$ alkyl groups, phenyl or benzyl, $R_2$ is either hydrogen or methyl, $R_3$ is a carbon chain including 0-4 carbon atoms, and n=1-4; and mixtures thereof.

By "solvent-borne resin" herein is meant a resin, or polymer, dispersed in or dissolved in a medium including less than 10% by weight water (a "solvent"). By "solvent-borne composition" herein is meant a composition dispersed in or dissolved in a medium including less than 10% by weight water. By a "solvent-borne coating" herein is meant a fluid, partially dried, or dry pigmented or unpigmented coating or adhesive composition dispersed in or dissolved in, or capable of being dispersed in or dissolved in a medium including less than 10% by weight water. By "a clean-up solvent and paint thinner" is meant a medium capable of dissolving a solvent-borne resin or coating.

In each instance herein R3 is a carbon chain including a certain number of carbon atoms; the chain may be, for example, saturated, unsaturated, substituted, part of a ring structure, or combinations thereof. The individual carbon atoms in the chain may bear substituent groups such as, for example, —OH, —Cl, =O, and the like.

Examples of glycol ether esters described by Formula I are diethylene glycol phenyl ether benzoate, dipropylene glycol phenyl ether levulinate, and tripropylene glycol n-butyl ether isopentanoate. Examples of bis-glycol ether esters described by Formula II are bis-dipropylene glycol n-butyl ether adipate, bis-diethylene glycol n-butyl ether malonate, bis-diethylene glycol n-butyl ether succinate, and bis-dipropylene glycol methyl ether maleate.

The glycol ether-esters of the present invention are esters of monocarboxylic acids or dicarboxylic acids and glycol ethers, the latter obtained by reacting alcohols or phenol with either ethylene oxide or propylene oxide. Any of several synthetic methods known to those skilled in the art can be used to prepare the aforementioned esters. For instance, stoichiometric amounts of the glycol ether and the desired carboxylic acid can be heated in the presence of a catalytic amount of a strong acid such as, for example, concentrated sulfuric acid and p-toluene sulfonic acid and a solvent such as, for example, heptane, and water removed azeotropically to yield the desired product. Another method of preparation employs the acid monochloride (or dichloride) instead of the carboxylic acid as a reactant. In this case, hydrogen chloride gas is given off instead of water during the reaction of the acid chloride with the glycol ether. The hydrogen chloride may be trapped using a water scrubber. Still another method of preparation involves the transesterification of a simple alkyl ester of the desired acid with a glycol ether in the presence of a titanium catalyst such as tetraisopropyl titanate. Still another method of esterification uses the acid anhydride as reactant in combination with the azeotropic removal of water. This method is aimed at producing diesters. Glycol ether esters obtained by any of the aforementioned methods can be purified by flash distillation under high vacuum.

The structural requirements of the glycol ether esters of the clean-up solvent and paint thinner for solvent-borne resins and coatings of the invention have been set forth in Formulas (I) and (II). The glycol ether esters are typically liquids in the 0-25° C. temperature range to facilitate their use as thinners and clean up solvents. These products are desirably less than 10% volatile by Method 24, preferably less than 5% volatile, and most preferably less than 1% volatile to be useful as low VOC solvents in the U.S. To be classified as VOC-exempt in the EU, the solvents must boil above 250° C. and preferably above 280° C.

Glycol ether monoesters described by Formula (I) were prepared from benzoic acid (or benzoyl chloride), ethyl levulinate, isopentanoic acid and valeric acid. Bis-glycol ether esters described by Formula (II) were prepared from malonic acid, succinic acid, maleic anhydride, and adipic acid (or adipoyl chloride). Glycol ethers used in these preparations were ethylene glycol n-hexyl ether, triethylene glycol n-hexyl ether, dipropylene glycol 2-ethylhexyl ether, diethylene glycol n-hexyl ether, diethylene glycol phenyl ether, diethylene glycol n-butyl ether, dipropylene glycol phenyl ether, tripropylene glycol n-pentyl ether, dipropylene glycol methyl ether, tripropylene glycol methyl ether, dipropylene glycol n-butyl ether, dipropylene glycol n-propyl ether, tripropylene glycol n-propyl ether, propylene glycol n-butyl ether, tripropylene glycol n-butyl ether, triethylene glycol n-butyl ether, propylene glycol methyl ether, triethylene glycol n-pentyl ether, and ethylene glycol n-pentyl ether. Ethylene glycol phenyl ether and propylene glycol phenyl ether were used to prepare benzoates and succinates but the resulting glycol ether esters were solids melting in the 50-100° C. range which limits their utility as thinners and clean up solvents. The clean-up solvent and paint thinner for solvent-borne resins and coatings of the invention may include, in addition to the glycol ether-esters that can be used at a wide variety of concentrations ranging from 1 to 100%, by weight based on the weight of the clean-up solvent and paint thinner, other solvents commonly used in paint thinning and cleanup such as, for example, mineral spirits, alkanes, aromatic hydrocarbons, acetone, and esters such as alkyl acetates, propionates, benzoates, adipates, and phthalates.

The solvent-borne composition of the present invention includes the clean-up solvent and paint thinner of the invention and a solvent-borne polymer. Solvent-borne polymers include, for example, alkyds, styrenated alkyds, acrylic-modified alkyds, urethane polymers or prepolymers, uralkyds, epoxy resins, and the like. The solvent-borne composition may include pigments, extenders, and other coating adjuvants as are known in the coatings arts.

In the method for cleaning or thinning a solvent-borne polymeric composition of the present invention a solvent-borne polymeric composition is contacted with the clean-up solvent and paint thinner of the invention.

The invention in some of its embodiments will now be further described by reference to the following examples:

EXAMPLE 1

Preparation of Diethylene Glycol Phenyl Ether Benzoate

In a 2-L one-neck flask equipped with a magnetic stirrer, a heating mantle, and a Dean-Stark trap connected to a nitrogen purged condenser were placed 517.5 g dipropylene glycol phenyl ether technical grade containing a total hydroxyl content of 3.0 moles, 363.3 g (2.97 mole) benzoic acid, 300 ml heptane, and 20 drops concentrated sulfuric acid. The flask was heated to 115° C. to establish a constant heptane reflux through the trap where the water of esterification was collected. The reaction was allowed to continue for a total of 48 hours, at which point the theoretical amount of water was collected. The reaction mixture was cooled to 25° C. and then filtered through a small bed of activated basic alumina to neutralize the catalyst. The filtrate was placed in a boiling flask and the heptane removed at low pressure in a Büchi rotary evaporator. The residue was flash distilled under vacuum to isolate the diethylene glycol phenyl ether benzoate boiling at 165° C. @ 0.1 mmHg. The boiling point at reduced pressure was corrected to the normal boiling by means of a computer program that fits vapor pressure data to an Antoine equation of the form $\log P = A - B/(T+C)$. The normal boiling point was calculated at approximately 440° C. A sample of the product was then tested as specified by EPA Method 24 and found to contain only 0.7 percent volatiles.

Properties of glycol ether-esters are presented in Table 1.1.
Compounds 1-3 are compounds not of the present invention.

| | Solvent Type | Chemical Name | Percent Volatility (EPA Method 24) | Boiling Point (° C. @ 760 mmHg) |
|---|---|---|---|---|
| 1 | Ester alcohol | 2,2,4-trimethyl-1,3-pentanediol monoisobutyrate (Texanol ®) | 99.8 | 255 |
| 2 | Glycol diester | Triethylene glycol bis-2-ethylhexanoate (Optifilm ® Enhancer 400) | 1.1 | 422 |
| 3 | Bis-alkyl ester | Bis (2-ethyl hexyl) adipate | 0.8 | 417 |
| 4 | Glycol ether ester | Triethylene glycol n-hexyl ether benzoate | 0.4 | 441 |
| 5 | Glycol ether ester | Dipropylene glycol 2-ethylhexyl ether benzoate | 4.3 | 420 |
| 6 | Glycol ether ester | Diethylene glycol n-hexyl ether benzoate | 3.5 | 390 |
| 7 | Glycol ether ester | Ethylene glycol phenyl ether benzoate | 2.6 (solid) | 370 |
| 8 | Glycol ether ester | Diethylene glycol phenyl ether benzoate | 0.7 | 440 |
| 9 | Glycol ether ester | Tripropylene glycol n-pentyl ether benzoate | 2.2 | 425 |
| 10 | Glycol ether ester | Dipropylene glycol phenyl ether benzoate | 1.5 | 422 |
| 11 | Glycol ether ester | Dipropylene glycol n-butyl ether benzoate | 10.7 | 375 |
| 12 | Glycol ether ester | Tripropylene glycol n-butyl ether benzoate | 4.3 | 410 |
| 13 | Glycol ether ester | Ethylene glycol n-pentyl ether benzoate | 45.6 | 305 |
| 14 | Glycol ether ester | Ethylene glycol n-butyl ether benzoate | 78.1 | 290 |
| 15 | Glycol ether ester | Triethylene glycol n-pentyl ether benzoate | 1.7 | 425 |
| 16 | Glycol ether ester | Dipropylene glycol phenyl ether levulinate | 2.6 | 414 |
| 17 | Glycol ether ester | Ethylene glycol n-hexyl ether levulinate | 37.4 | 332 |
| 18 | Glycol ether ester | Diethylene glycol n-hexyl ether levulinate | 10.6 | 383 |
| 19 | Glycol ether ester | Diethylene glycol phenyl ether levulinate | 1.2 | 420 |
| 20 | Glycol ether ester | Tripropylene glycol methyl ether levulinate | 6.9 | 367 |
| 21 | Glycol ether ester | Tripropylene glycol n-propyl ethet levulinate | 7.2 | 385 |
| 22 | Glycol ether ester | Triethylene glycol n-butyl ether levulinate | 3.6 | 403 |
| 23 | Glycol ether ester | Tripropylene glycol n-butyl ether levulinate | 3.1 | 403 |
| 24 | Glycol ether ester | Tripropylene glycol n-butyl ether isopentanoate | 27.5 | 390 |
| 25 | Glycol ether ester | Diethylene glycol phenyl ether isopentanoate | 10 | 382 |
| 26 | Glycol ether ester | Triethylene glycol n-hexyl ether isopentanoate | 8.1 | 396 |
| 27 | Glycol ether ester | Triethylene glycol n-butyl ether isopentanoate | 20.6 | 360 |
| 28 | Glycol ether ester | Triethylene glycol n-hexyl ether valerate | 5.8 | 398 |
| 29 | Bis-Glycol ether ester | Bis-Ethylene glycol phenyl ether succinate | solid | 485 |
| 30 | Bis-glycol ether ester | Bis-Diethylene glycol n-butyl ether succinate | 0.4 | 452 |
| 31 | Bis-glycol ether ester | Bis-Propylene glycol phenyl ether succinate | 0.3 (solid) | 483 |
| 32 | Bis-glycol ether ester | Bis-Ethylene glycol n-hexyl ether succinate | 0.8 | 430 |
| 33 | Bis-glycol ether ester | Bis-Tripropylene glycol methyl ether succinate | 1.6 | 464 |
| 34 | Bis-glycol ether ester | Bis-Dipropylene glycol n-propyl ether succinate | 1.8 | 450 |
| 35 | Bis-glycol ether ester | Bis-Dipropylene glycol n-butyl ether succinate | 1.0 | 460.0 |
| 36 | Bis-glycol ether ester | Bis-Diethylene glycol n-butyl ether maleate | 0.5 | 476.0 |
| 37 | Bis-glycol ether ester | Bis-Ethylene glycol n-hexyl ether maleate | 0.8 | 456.0 |
| 38 | Bis-glycol ether ester | Bis-Tripropylene glycol methyl ether maleate | 4.3 | 449.0 |

-continued

| | Solvent Type | Chemical Name | Percent Volatility (EPA Method 24) | Boiling Point (° C. @ 760 mmHg) |
|---|---|---|---|---|
| 39 | Bis-glycol ether ester | Bis-Dipropylene glycol n-butyl ether maleate | 0.1 | 476.0 |
| 40 | Bis-glycol ether ester | Bis-Propylene glycol methyl ether maleate | 33.1 | 380.0 |
| 41 | Bis-glycol ether ester | Bis-Diethylene glycol n-hexyl ether malonate | 1.7 | 440 |
| 42 | Bis-glycol ether ester | Bis-Propylene glycol methyl ether malonate | 72.5 | 330 |
| 43 | Bis-glycol ether ester | Bis-Diethylene glycol n-butyl ether adipate | 0.5 | 479 |
| 44 | Bis-glycol ether ester | Bis-Ethylene glycol n-hexyl ether adipate | 0.3 | 450 |
| 45 | Bis-glycol ether ester | Bis-Dipropylene glycol methyl ether adipate | 0.5 | 420 |
| 46 | Bis-glycol ether ester | Bis-Tripropylene glycol methyl ether adipate | 0.9 | 471 |
| 47 | Bis-glycol ether ester | Bis-Dipropylene glycol n-butyl ether adipate | 0.2 | 485 |
| 48 | Bis-glycol ether ester | Bis-Dipropylene glycol n-propyl ether adipate | 0.5 | 470 |
| 49 | Bis-glycol ether ester | Bis-Propylene glycol n-butyl ether adipate | 4.6 | 443 |
| 50 | Bis-glycol ether ester | Bis-Propylene glycol methyl ether adipate | 18.6 | 405 |

EXAMPLE 2

Evaluation of Diethylene Glycol Phenyl Ether Benzoate and Other Solvents as Paint Brush Cleaners The ability of a solvent to remove paint from a brush was evaluated as follows. A few mL of a given test solvent was placed in a 5-dram vial. A ¼" brush was dipped in KILZ™ (Masterchem Industries) interior oil-based primer and then dipped into the test solvent. Brush cleaning in the vial was attempted for several seconds and visually rated on the scale terrible-poor-good-excellent. The following results were observed with various solvents:

| Substance | Performance |
|---|---|
| Water | terrible |
| Mineral spirits | excellent |
| Bis-Dipropylene glycol n-butyl ether adipate | good |
| Diethylene glycol phenyl ether benzoate | good |
| Bis-Ethylene glycol n-hexyl ether succinate | good |
| Bis-Diethylene glycol n-butyl ether adipate | good |
| Diethylene glycol phenyl ether, technical grade | poor, clumpy |
| Hexaethylene glycol phenyl ether (distribution of oligomers) | poor, clumpy |
| SOLUSOLV ™ 2075 (OPTIFILM ™ 400) | good |

Test results showed that the glycol ether-esters of the invention performed better than water and as good as a commercial low VOC solvent (SOLUSOLV™ 2075). By contrast, solvents like diethylene glycol phenyl ether (technical grade) and hexaethylene glycol phenyl ether, not of the invention, performed poorly.

EXAMPLE 3

Evaluation of Diethylene Glycol Phenyl Ether Benzoate and Other Solvents as Paint Cleanup Solvents Via UV-Visible Absorption The ability of various solvents to remove paint from a tube via flushing was evaluated. Conditions were designed to mimic the flushing of paint lines. Tubular sections from plastic pipettes 3" long by 0.1" I.D. were prepared. KILZ™ interior oil-based primer was drawn into and expelled from each tube to leave a thin layer coating the tube interior. 10 mL pipettes were filled with 4 mL each of various trial cleanup solvents. Each solvent was allowed to pass through a tube via gravity with no pressure assistance to remove the paint. Each tube was then flushed with a 50/50 blend of acetone and mineral spirits to remove any remaining paint. The acetone/spirits blend was collected for each tube. The collected acetone/spirits blends were diluted 1 part to 4 with fresh acetone/spirits. The diluted solutions were then analyzed for UV-visible absorption with a Nicolet evolution 300. Lower absorbance indicated the initial solvent did a better job cleaning out paint from the tube prior to flushing with acetone/spirits.

Three glycol ether esters of the invention were tested. In addition, water, mineral spirits, and propylene carbonate were tested. Water was included for reference as it is known to be poor to dissolving paint. Mineral spirits were included as they are commonly used for paint cleanup but are 100% VOC. Propylene carbonate was included for comparison purposes as it is one of few solvents with a VOC exemption under the Federal Register per low photochemical smog formation potential. Results for each solvent at 150 nm wavelength intervals are given in the table below.

TABLE 3.1 measurement of residual solvent-borne coating.

| | Wavelength (nm) | | | | |
|---|---|---|---|---|---|
| | 450 | 600 | 750 | 900 | 1050 |
| Acetone/Spirits reference | −0.025 | −0.023 | −0.032 | −0.005 | −0.056 |
| Water | 2.524 | 2.652 | 2.379 | 1.964 | 1.51 |
| Mineral Spirits | 1.1719 | 1.824 | 1.558 | 1.214 | 0.882 |
| Diethylene glycol phenyl ether benzoate | 1.056 | 1.097 | 0.909 | 0.701 | 0.501 |
| Bis-Diethylene glycol n-butyl ether adipate | 2.05 | 2.166 | 1.846 | 1.433 | 1.037 |

TABLE 3.1-continued measurement of residual solvent-borne coating.

| | Wavelength (nm) | | | | |
|---|---|---|---|---|---|
| | 450 | 600 | 750 | 900 | 1050 |
| Bis-Dipropylene glycol n-butyl ether adipate | 1.977 | 2.103 | 1.803 | 1.412 | 1.025 |
| Propylene Carbonate | 2.899 | 3.004 | 2.78 | 2.386 | 1.85 |

Bis-Dipropylene glycol n-butyl ether adipate and Bis-Diethylene glycol n-butyl ether adipate of the invention were almost as effective in flushing paint as mineral spirits. Diethylene glycol phenyl ether benzoate of the invention was more effective, and water and propylene carbonate were considerably less effective.

What is claimed is:

1. A clean-up solvent and paint thinner selected from the group consisting of dipropylene glycol phenyl ether levulinate, and tripropylene glycol n-butyl ether isopentanoate.

2. A solvent-borne composition comprising a solvent-borne polymer and a glycol ether-ester composition selected from the group of compositions of Formula (I)

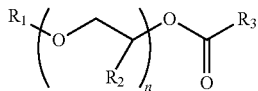
(I)

wherein $R_1$ is a $C_1$-$C_{10}$ alkyl group, phenyl or benzyl, $R_2$ is methyl, $R_3$ is a saturated, unsaturated, or substituted group, part of a ring structure, or combinations thereof comprising 4-6 carbon atoms, and n=2-4;
of Formula (II)

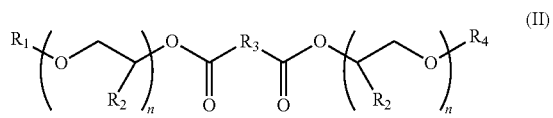
(II)

wherein $R_1$ and $R_4$ are, independently, $C_1$-$C_{10}$ alkyl groups, phenyl or benzyl, $R_2$ is methyl, $R_3$ is a carbon chain comprising 0-4 carbon atoms, and n=1-4;
and mixtures thereof.

3. A method for cleaning or thinning a solvent-borne polymeric composition comprising contacting a solvent-borne polymeric composition with a glycol ether-ester composition selected from the group of compositions of Formula (I)

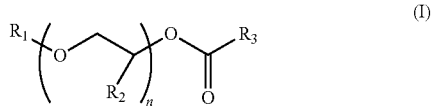
(I)

wherein $R_1$ is a $C_1$-$C_{10}$ alkyl group, phenyl or benzyl, $R_2$ is methyl, $R_3$ is a saturated, unsaturated, or substituted group, part of a ring structure, or combinations thereof comprising 4-6 carbon atoms, and n=2-4;
of Formula (II)

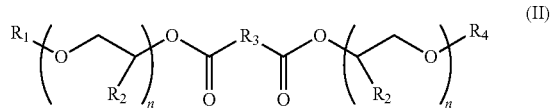
(II)

wherein $R_1$ and $R_4$ are, independently, $C_1$-$C_{10}$ alkyl groups, phenyl or benzyl, $R_2$ is methyl, $R_3$ is a carbon chain comprising 0-4 carbon atoms, and n=1-4;
and mixtures thereof.

* * * * *